United States Patent
Etoh et al.

(10) Patent No.: US 9,143,048 B2
(45) Date of Patent: Sep. 22, 2015

(54) POWER SUPPLY DEVICE AND ARC MACHINING POWER SUPPLY DEVICE

(71) Applicant: DAIHEN CORPORATION, Osaka (JP)

(72) Inventors: Tetsuya Etoh, Osaka (JP); Haruhiko Manabe, Osaka (JP)

(73) Assignee: Daihen Corporation, Osaka (JP)

( * ) Notice: Subject to any disclaimer, the term of this patent is extended or adjusted under 35 U.S.C. 154(b) by 368 days.

(21) Appl. No.: 13/674,329

(22) Filed: Nov. 12, 2012

(65) Prior Publication Data

US 2013/0126482 A1 May 23, 2013

(30) Foreign Application Priority Data

Nov. 21, 2011 (JP) ................. 2011-254099

(51) Int. Cl.
| | | |
|---|---|---|
| *B23K 9/00* | (2006.01) | |
| *H02M 5/458* | (2006.01) | |
| *B23H 1/00* | (2006.01) | |
| *H02M 1/10* | (2006.01) | |
| *H02M 7/217* | (2006.01) | |
| *B23K 9/10* | (2006.01) | |
| *H02M 3/337* | (2006.01) | |
| *H02M 1/00* | (2007.01) | |

(52) U.S. Cl.
CPC ............. *H02M 5/458* (2013.01); *B23H 1/00* (2013.01); *B23K 9/1043* (2013.01); *H02M 1/10* (2013.01); *H02M 7/2176* (2013.01); *H02M 3/3378* (2013.01); *H02M 2001/007* (2013.01); *H02M 2001/0032* (2013.01); *Y02B 70/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,396,722 | B2* | 5/2002 | Lin ................................. | 363/98 |
| 7,804,254 | B2* | 9/2010 | Yao et al. ....................... | 315/291 |
| 7,825,605 | B2* | 11/2010 | Zhang et al. ................... | 315/224 |
| 8,358,082 | B2* | 1/2013 | Henry et al. ................... | 315/247 |
| 8,804,375 | B2* | 8/2014 | Manabe et al. ................. | 363/17 |
| 2003/0156435 | A1 | 8/2003 | Morimoto et al. | |
| 2011/0188275 | A1 | 8/2011 | Mino | |
| 2012/0120687 | A1 | 5/2012 | Ohsaki et al. | |
| 2012/0140524 | A1 | 6/2012 | Manabe et al. | |
| 2012/0169131 | A1* | 7/2012 | Choudhary et al. .......... | 307/104 |
| 2013/0126482 | A1* | 5/2013 | Etoh et al. ..................... | 219/69.1 |

FOREIGN PATENT DOCUMENTS

| | | |
|---|---|---|
| EP | 1337033 A2 | 8/2003 |
| EP | 2461473 A2 | 6/2012 |

(Continued)

OTHER PUBLICATIONS

Extended European Search Report for Appl. No. 12191418.8-1809 dated Sep. 3, 2014.

*Primary Examiner* — Dana Ross
*Assistant Examiner* — Renee L Miller
(74) *Attorney, Agent, or Firm* — Caesar Rivise, PC (57) ABSTRACT

A power supply device that is applicable to both 200 V and 400 V series input power by switching the operation of an auxiliary switching circuit with a switching switch. When a relatively large output is requested, PWM control is performed to adjust the on pulse width of a control pulse signal provided to switching elements of an inverter circuit and an auxiliary switching circuit, which is operated in cooperation with the inverter circuit. When a relatively small output is requested, PSM control is performed to adjusting a phase difference of two control pulse signals provided to the same set of switching elements in the inverter circuit.

5 Claims, 8 Drawing Sheets

(56) References Cited

FOREIGN PATENT DOCUMENTS

| | | | | |
|---|---|---|---|---|
| JP | 2009-017656 | * | 3/2007 | .............. H02M 3/28 |
| JP | 2009-017656 A | | 1/2009 | |
| JP | 2011160616 A | | 8/2011 | |
| JP | 2011177023 A | | 9/2011 | |

* cited by examiner

POWER SUPPLY DEVICE AND ARC MACHINING POWER SUPPLY DEVICE

CROSS-REFERENCE TO RELATED APPLICATIONS

This application is based upon and claims the benefit of priority from prior Japanese Patent Application No. 2011-254099, filed on Nov. 21, 2011, the entire contents of which are incorporated herein by reference.

BACKGROUND OF THE INVENTION

The present invention relates to a power supply device and an arc machining power supply device that includes an inverter circuit, which converts alternating current (AC) power from a commercial power into direct current (DC) voltage and then converts the DC voltage to a predetermined AC voltage, and are applicable to input power including a plurality of different voltage values.

Japanese Laid-Open Patent Publication No. 2009-17656 describes an example of a power supply device for an arc machine or the like that includes a DC converter circuit, which converts AC voltage to DC voltage, and an inverter circuit, which converts the DC voltage to AC voltage. The DC converter circuit includes a rectifier circuit, which rectifies commercial power (three phase AC power) and a smoothing capacitor, which smoothes the rectified DC voltage. The inverter circuit includes a bridge circuit of a plurality of switching elements (first to fourth switching elements). The inverter circuit synchronously controls the activation and deactivation of a predetermined combination of the switching elements to convert the DC voltage from the DC converter circuit into a predetermined high frequency AC voltage. The predetermined high frequency AC voltage from the inverter circuit is further converted into machining DC voltage that is suitable for arc machining such as arc welding and arc cutting.

The power supply device includes a switching switch that switches between an internal operation of a specification corresponding to a commercial power of 200 V (200 V series) and an internal operation of a specification corresponding to a commercial power of 400 V (400 V series).

Specifically, an auxiliary switching circuit is arranged between the DC converter circuit and the inverter circuit. The auxiliary switching circuit includes an auxiliary capacitor, which is connected between two power lines at the upstream side of the inverter circuit. Further, the auxiliary switching circuit includes, between the DC converter circuit and the auxiliary switching circuit, fifth and sixth switching elements, which are arranged in the two power lines, and seventh and eighth switching elements, which are connected in series between the two power lines. The DC converter circuit includes a smoothing capacitor, namely, first and second smoothing capacitors connected in series between the two power lines in the present embodiment. The switching switch is connected between a first node of the first and second smoothing capacitors and a second node of the seventh and eighth switching elements. The switching switch connects and disconnects the first node and the second node.

When the commercial power of 200 V is supplied (hereinafter referred to as the 200 V series input), the switching switch disconnects the first node and the second node and supplies the inverter circuit with the voltage applied to the two ends of the first and second smoothing capacitors that are connected in series. When the commercial power of 400 V is supplied (hereinafter referred to as the 400 V series input), the switching switch connects the first node and the second node. As a result, by activating and deactivating a predetermined combination of the fifth to eighth switching elements, the voltage applied to the two ends of the first smoothing capacitor and the voltage applied to the ends of the second smoothing capacitor are alternately supplied to the inverter circuit. In this manner, the same DC voltage is supplied to the inverter circuit regardless of the voltage value of the input power.

In the auxiliary switching circuit, a soft switching control is performed to deactivate predetermined ones of the fifth to eighth switching elements before deactivation of the first to fourth switching elements of the inverter circuit. This switches each element with a zero voltage and zero current thereby reducing switching loss.

When controlling the inverter circuit, a typical pulse width modulation control (PWM control) is performed to adjustment the output of the power supply device to an extremely small level. In such a case, a control pulse signal provided to the switching elements of the inverter circuit and the auxiliary switching circuit, which is operated in cooperation with the inverter circuit, is set to have an extremely narrow on pulse width. This may hinder the activation of the switching elements and lead to shortcomings such as output instability and biased magnetism. It is thus desired that the output of the power supply device be stabilized while using PWM control.

One aspect of the present invention is a power supply device including a DC converter, and inverter circuit, an auxiliary switching circuit, a pulse width modulation circuit, a phase shift control unit, and a control switching unit.

The DC converter circuit includes a rectifier circuit and first and second smoothing capacitors, which are connected in series and arranged between two power lines at an output side of the rectifier circuit. The DC converter circuit rectifies and smoothes input AC power and converts the input AC power into DC voltage.

The inverter circuit includes a bridge circuit of first to fourth switching elements. Predetermined sets of the first to fourth switching elements are alternately activated and deactivated to convert the DC voltage to a predetermined AC voltage.

The auxiliary switching circuit includes an auxiliary capacitor, which is connected between the two power lines between the DC converter circuit and the inverter circuit, fifth and sixth switching elements respectively arranged on the two power lines between the DC converter circuit and the auxiliary capacitor, seventh and eighth switching elements connected in series between the two power lines between the auxiliary capacitor and the first and sixth switching elements, and a switching unit that connects or disconnects a first node of the first and second smoothing capacitors and a second node of the seventh and eighth switching elements.

The switching unit disconnects the first and second nodes when the input AC power has a first voltage value to supply a voltage across two terminals of the first and second smoothing capacitors to the inverter circuit. The switching unit connects the first and second nodes when the input AC power has a second voltage value that is two times greater than the first voltage value so that soft switching control is performed by activating and deactivating predetermined sets of the fifth to eighth switching elements, alternately supplying the inverter circuit with a voltage across the terminals of the first or second smoothing capacitor, and deactivating a predetermined one of the fifth to eighth switching elements before the first to fourth switching elements are deactivated to stop the voltage supplied to the inverter circuit.

The pulse width modulation control unit adjusts an on pulse width of a control pulse signal provided to the first to fourth switching elements and adjusts an on pulse width of a control pulse signal provided to the fifth to eighth switching elements in accordance with the adjusted width.

The phase shift control unit adjusts a phase difference of two control pulse signals provided to the same set of switching elements in the first to fourth switching elements or adjusts a phase difference of two control pulse signals provided to predetermined ones of the first to fourth switching elements and corresponding ones of the fifth to eighth switching elements.

The control switching unit operates the pulse width modulation control unit when a relatively large output is requested and operates the phase shift control unit when a relatively small output is requested.

DETAILED DESCRIPTION OF THE INVENTION

An arc machining power supply device according to one embodiment of the present invention will now be described with reference to the drawings.

Figure 1:
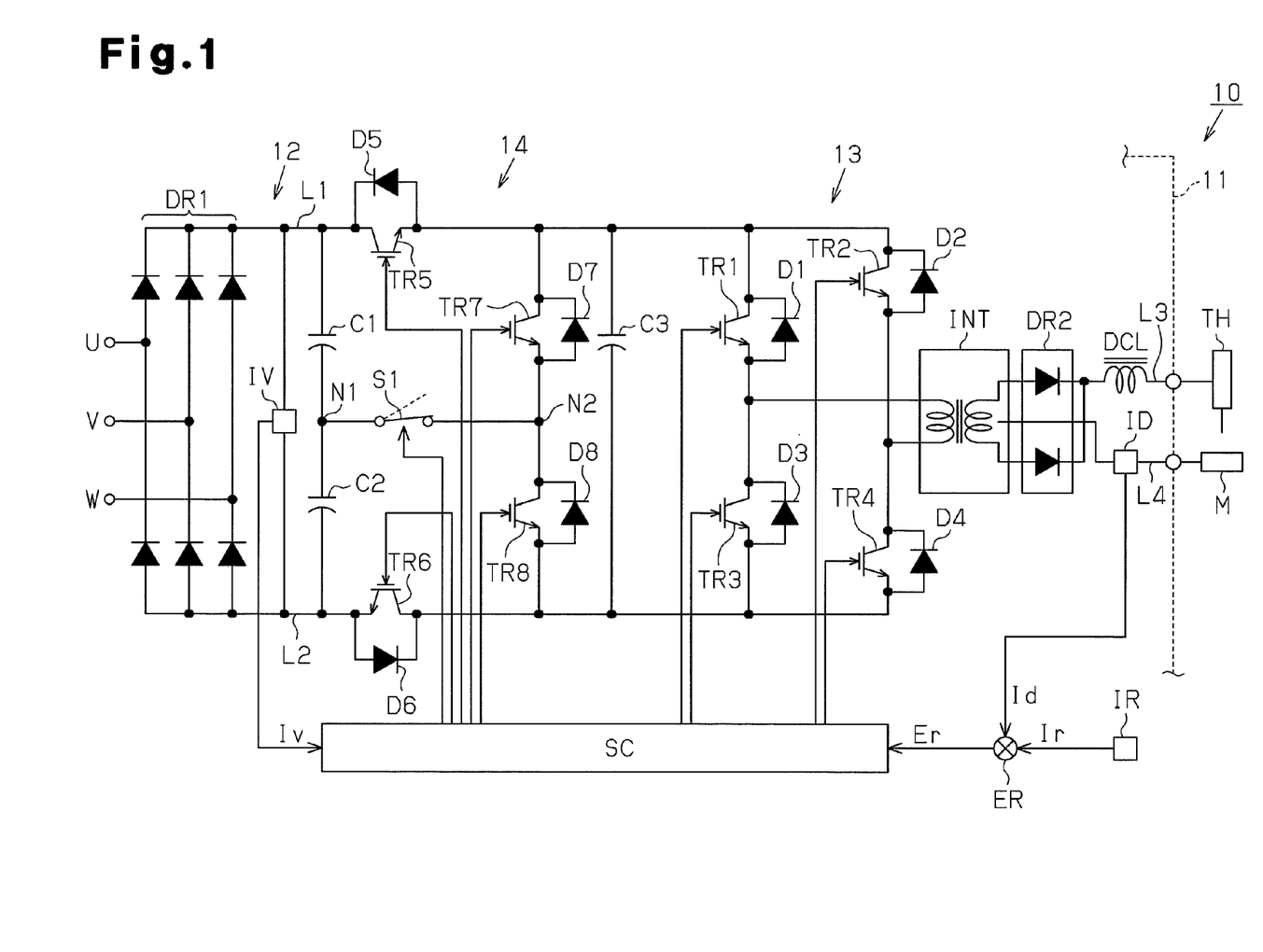
FIG. 1 is a circuit diagram of an arc machining power supply device according to one embodiment.

FIG. 1 shows an arc machine 10 including an arc machining power supply device 11 of the present embodiment. The arc machine 10 supplies machining DC voltage from the power supply device 11 to a torch TH so that the torch TH generates an arc directed toward a machining subject M. The arc machine 10 carries out arc machining such as arc welding, arc cutting, and the like on the machining subject M. The arc machining power supply device 11 of the arc machine 10 includes a DC converter circuit 12, which converts the supplied commercial power (three phase AC voltage) into DC voltage, and an inverter circuit 13, which converts the DC voltage into a predetermined high frequency AC voltage. The arc machining power supply device 11 also includes a transformer INT and a secondary side circuit to convert the high frequency AC voltage from the inverter circuit 13 into machining DC voltage.

The DC converter circuit 12 includes a primary side rectifier circuit DR1 and first and second smoothing capacitors C1 and C2. The primary side rectifier circuit DR1, which includes a bridge circuit of six diodes, performs full-wave rectification on three-phase AC power. The first and second smoothing capacitors C1 and C2 are connected in series between two power lines L1 and L2 to smooth the output voltage of the rectifier circuit DR1. The DC converter circuit 12 generates DC voltage from the supplied AC power. The first and second smoothing capacitors C1 and C2 have the same capacitance. A voltage detection circuit IV, which detects the DC voltage, is connected between the two power lines L1 and L2 in the DC converter circuit 12. The voltage detection circuit IV provides an output control circuit SC (described later) with the detected DC voltage as a voltage detection signal Iv. The output control circuit SC determines whether to supply the AC power of the 200 V series or the AC power of the 400 V series to the power supply device 11.

The inverter circuit 13 includes a bridge circuit of first to fourth switching elements TR1 to TR4 connected to the two power lines L1 and L2. In the present embodiment, the first to fourth switching elements TR1 to TR4 are insulated gate bipolar transistors (IGBTs). The first and third switching elements TR1 and TR3 are connected in series between the two power lines L1 and L2. The second and fourth switching elements TR2 and TR4 are connected in series between the two power lines L1 and L2. A primary side coil in the transformer INT includes one end connected between the emitter of the switching element TR1 and the collector of the switching element TR3 and another end connected between the emitter of the switching element TR2 and the collector of the switching element TR4. First to fourth diodes D1 to D4 are reversely connected to the first to fourth switching elements TR1 to TR4, respectively. A combination of the first and fourth switching elements TR1 and TR4 and a combination of the second and third switching elements TR2 and TR3 are alternately activated and deactivated under the control of the output control circuit SC. This converts the DC voltage from the DC converter circuit 12 into a predetermined high frequency AC voltage that is supplied to the primary side coil of the transformer INT.

An auxiliary switching circuit 14 and an auxiliary capacitor C3 are arranged between the inverter circuit 13 and the DC converter circuit 12. The auxiliary switching circuit 14 includes fifth to eighth switching elements TR5 to TR8 that are configured by four IGBTs. In the present embodiment, the fifth to eighth switching elements TR5 to TR8 are IGBTs. The fifth switching element TR5 is arranged on the power line L1 at the downstream side of the first and second smoothing capacitors C1 and C2. The sixth switching element TR6 is arranged on the power line L2 at the downstream side of the first and second smoothing capacitors C1 and C2. The seventh and eighth switching elements TR7 and TR8 are connected in series between the two power supplies L1 and L2 at the downstream side of the fifth and sixth switching elements TR5 and TR6. Fifth to eighth diodes D5 to D8 are reversely connected to the fifth to eighth switching elements TR5 to TR8, respectively. The auxiliary capacitor C3 is connected between the two power lines L1 and L2 at the downstream side of the seventh and eighth switching elements TR7 and TR8.

A switching switch S1 is connected between a node N2 of the emitter of the seventh switching element TR7 and the collector of the eighth switching element TR8 and a node N1 of the first and second smoothing capacitors C1 and C2. In the present embodiment, the switching switch S1 is a relay. The switching switch S1 is deactivated when determined that the AC power of 200 V series is supplied under the control of the output control circuit SC. This disconnects the two nodes N1 and N2. The switching switch S1 is activated when determined that the AC power of 400 V series is supplied under the control of the output control circuit SC. This connects the two nodes N1 and N2. The fifth to eighth switching elements TR5 to TR8 are activated and deactivated in synchronism with the switching elements TR1 to TR4 under the control of the output control circuit SC. This reduces the switching loss of the first to fourth switching elements TR1 to TR4 in the inverter circuit 13. The output control circuit SC performs a control corresponding to the 200 V series AC power and a control corresponding to the 400 V series AC power on the fifth to eighth switching elements TR5 to TR8.

The transformer INT includes, at a secondary side, a fullwave rectification secondary rectifier circuit DR2, which is configured by two diodes, and a DC reactor DCL. The DC reactor DCL is connected to the torch TH by an output line L3. An intermediate point of the secondary side coil of the transformer INT is connected by an output line L4 to a machining subject M. The transformer INT adjusts the value of the high frequency AC voltage generated by the inverter circuit 13. The secondary rectifier circuit DR2 and the DC reactor DCL convert the adjusted high frequency AC voltage into an arc machining DC voltage. The torch TH generates an arc directed toward the machining subject M based on the arc machining DC voltage that is supplied.

An output current detection circuit ID, which detects the actual output current value is connected to the output line L4. The output current detection circuit ID provides a comparison calculation circuit ER with the detected output current value as an output current detection signal Id. The comparison calculation circuit ER compares the output current detection signal Id with an output current set signal Ir from an output current setting unit IR. The output current setting unit IR is set with the output current value by human operation and the like so as to become the output current value corresponding to the machining subject M on which to perform arc machining. The output current setting unit IR outputs the set output current set signal Ir to the comparison calculation circuit ER. The comparison calculation circuit ER provides the output control circuit SC with a comparison calculation signal Er, which indicates the comparison result of the output current detection signal Id and the output current set signal Ir. In this manner, the comparison calculation circuit ER provides the output control circuit SC with the comparison calculation signal Er, which indicates the deviation of the output current value and the set value. The output control circuit SC uses the comparison calculation signal Er to perform feedback control.

The output control circuit SC determines the DC voltage generated by the DC converter circuit 12 based on the voltage detection signal Iv from the voltage detection circuit IV. The output control circuit SC determines whether the 200 V series AC voltage or the 400 V series AC voltage is supplied based on the detected DC voltage. The output control circuit SC activates the switching switch S1 when determining that a 400 V series AC voltage has been supplied and deactivates the switching switch S1 when determining that a 200 V series AC voltage has been supplied. The output control circuit SC controls the inverter circuit 13 and the auxiliary switching circuit 14 as shown by the timing waveforms (control pulse signals) in FIGS. 2 to 4 and FIGS. 5 to 7. The switching switch 1 is activated to be applicable to a 400 V series AC power before AC power is supplied.

As described above, the output control circuit SC determines the deviation of the output current value and the set value based on the comparison calculation signal Er. The output control circuit SC sets the switching control of the inverter circuit 13 to pulse width modulation control (PWM control) when requesting a range from a large output to a small output (hereinafter referred to as the large to small output request) in view of the deviation. The output control circuit SC sets the switching control of the inverter circuit 13 to phase shift control (PSM control) when requesting an extremely small output (hereinafter referred to as the extremely small output request). The output control circuit SC synchronizes the switching control of the auxiliary switching circuit 14 with the control mode of the inverter circuit 13 so that the auxiliary switching circuit 14 operates in cooperation with the inverter circuit 13.

When a 400 V series voltage is supplied (hereinafter referred to as the 400 V series input), the switching switch S1 is activated, and the node N1 of the first and second smoothing capacitors C1 and C2 and the node N2 of the seventh and eighth switching elements TR7 and TR8 are connected. In this case, as shown by the timing waveform charts of FIGS. 2 to 4, the output control circuit SC controls the first to eighth switching elements TR1 to TR8 of the inverter circuit 13 and the auxiliary switching circuit 14 with a plurality of control pulse signals.

Figure 2:
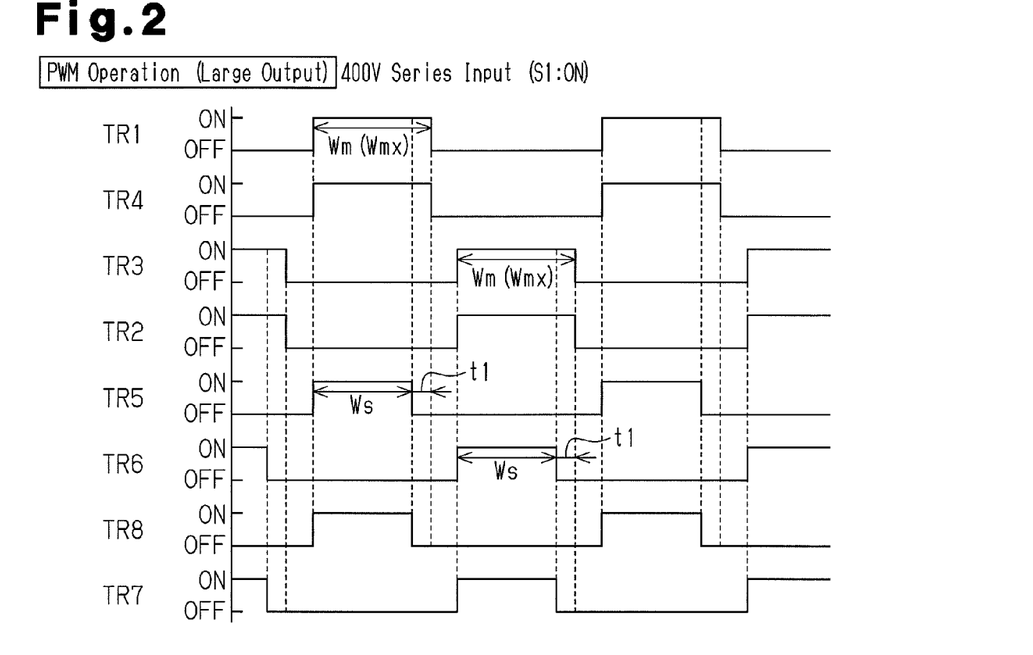
FIG. 2 is a waveform chart of a control pulse signal taken during a PWM operation (during a large output) for 400 V series inputs.
Figure 3:
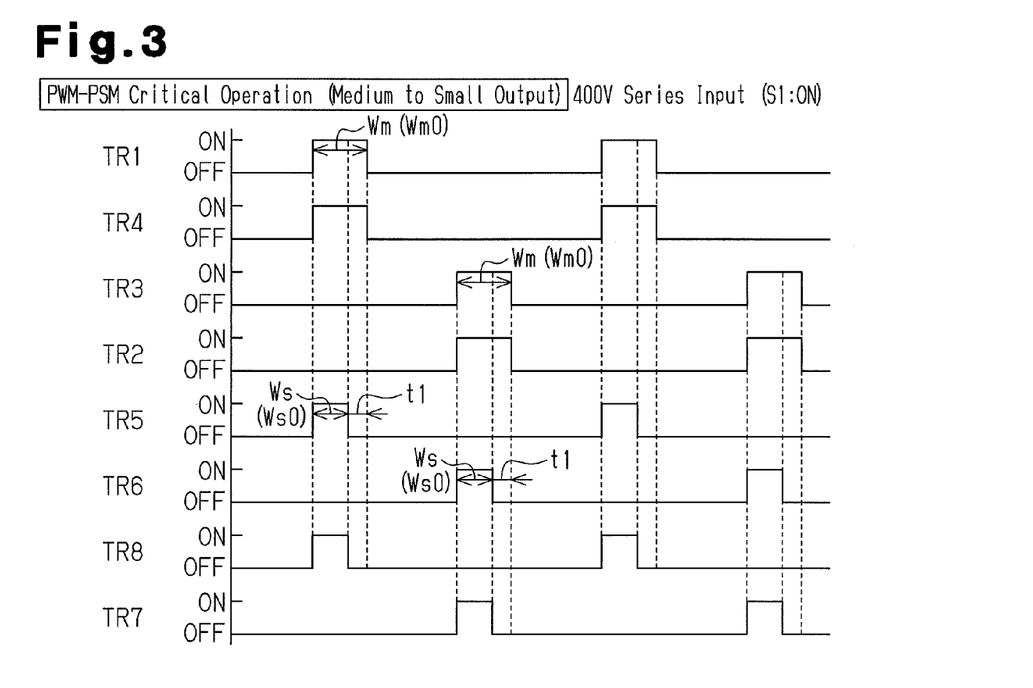
FIG. 3 is a waveform chart of a control pulse signal taken during a PWM-PSM critical operation (during a medium to small output) for 400 V series inputs.

Specifically, when performing the large to small output request, the output control circuit SC performs the PWM control using a plurality of control pulse signals, as shown in FIG. 2 and FIG. 3. The two control pulse signals respectively provided to the first and fourth switching elements TR1 and TR4 of the inverter circuit 13 simultaneously rise to an H level or fall to an L level. The two control pulse signals provided to the second and third switching elements TR2 and TR3 of the inverter circuit 13 also simultaneously rise to an H level or an L level. The four control pulse signals provided to the first to fourth switching elements TR1 to TR4 are set so that a combination of the first and fourth switching elements TR1 and TR4 and a combination of the second and third switching elements TR2 and TR3 are alternately activated and deactivated. The output control circuit SC sets the control pulse signal with a wide on pulse width Wm when requesting a large output and sets the control pulse signal with a narrow on pulse width Wm as the requested voltage value decreases. That is, the on pulse width Wm is adjusted between a maximum width Wmx of FIG. 2 and a minimum width Wm0 of FIG. 3 in accordance with the large to small output request.

The two control pulse signals provided to the fifth and eighth switching elements TR5 and TR8 of the auxiliary switching circuit 14 rise together with the two control pulse signals provided to the first and fourth switching elements TR1 and TR4 and fall a predetermined time t1 before the two control pulse signals are provided to the first and fourth switching elements TR1 and TR4. The two control pulse signals provided to the sixth and seventh switching elements TR6 and TR7 of the auxiliary switching circuit 14 rise together with the two control pulse signals provided to the second and third switching elements TR2 and TR3 and fall a predetermined time t1 before the two control pulse signals are provided to the second and third switching elements TR2 and TR3. That is, the fifth to eighth switching elements TR5 to TR8 are activated simultaneously with the corresponding first to fourth switching elements TR1 to TR4 but are deactivated a predetermined time t1 before the corresponding first to fourth switching elements TR1 to TR4 are deactivated. The predetermined time t1 is set to a time allowing for sufficient discharging of the auxiliary capacitor C3. This allows for the soft switching operation to be performed in which the switching elements TR1 to TR4 are deactivated after sufficient discharging.

During the ON period of the fifth and eighth switching elements TR5 and TR8, the voltage across the terminals of the first smoothing capacitor C1, that is, half of the DC voltage obtained by converting the 400 V series AC voltage into DC voltage (voltage equal to the DC voltage converted from the 200 V series AC voltage), is supplied to the inverter circuit 13. The voltage across the terminals of the auxiliary capacitor C3 is supplied to the inverter circuit 13 until the fifth and eighth switching elements TR5 and TR8 are deactivated and the discharging of the auxiliary capacitor C3 at the downstream side is completed. In the same manner, during the ON period of the sixth and seventh switching elements TR6 and TR7, the voltage across the terminals of the second smoothing capacitor C2 (voltage equal to the voltage across the terminals of the first smoothing capacitor C1) is supplied to the inverter circuit 13. The voltage across the terminals of the auxiliary capacitor C3 is supplied to the inverter circuit 13 until the sixth and seventh switching elements TR6 and TR7 are deactivated and the discharging of the auxiliary capacitor C3 at the downstream side is completed. Thus, in the inverter circuit 13, the voltage across the terminals of the first smoothing capacitor C1 is mainly applied to the primary side coil of the transformer INT during the ON period of the first and fourth switching elements TR1 and TR4. Further, the voltage across the terminals of the second smoothing capacitor C2 is mainly applied in the opposite direction to the primary side coil of the transformer INT during the ON period of the second and third switching elements TR2 and TR3.

The first to fourth switching elements TR1 to TR4 are deactivated when the predetermined time t1 elapses, during which the auxiliary capacitor C3 is sufficiently discharged, after the corresponding fifth to eighth switching elements TR5 to TR8 are deactivated and the supply of the DC voltage from the DC converter circuit 12 is stopped. This reduces the switching loss when the first to fourth switching elements TR1 to TR4 are deactivated. The fifth to eighth switching elements TR5 to TR8 are deactivated in a state in which the corresponding upstream smoothing capacitors C1 and C2 and the downstream auxiliary capacitor C3 have the same voltage across the terminals. This reduces the switching loss when the fifth to eighth switching elements TR5 to TR8 are deactivated. Further, due to the relationship of the leakage inductance and the like at the primary side coil of the transformer INT, the switching loss is further reduced when the first to fourth switching elements TR1 to TR4 and the fifth to eighth switching elements TR5 to TR8 are activated.

In the PWM control, the on pulse widths Wm and Ws of the control pulse signal provide to the first to fourth switching elements TR1 to TR4 of the inverter circuit 13 and the fifth to eighth switching elements TR5 to TR8 of the auxiliary switching circuit 14 are set to gradually narrow as the request changes from a large output to an intermediate output and from an intermediate output to a small output. The control of the first to eighth switching elements TR1 to TR8 shifts from PWM control to PSM control during the extremely small output request in which the on pulse width Wm is set to a width that is narrower than the minimum width Wm0.

The on pulse width Ws follows the on pulse width Wm. Thus, only the set width of the on pulse width Wm needs to be monitored. As will be described later, the on pulse width Wm when a 200 V series AC power is supplied (hereinafter referred to as the 200 V series input) changes in the same manner as a 400 V series input, and the on pulse width Ws changes greatly. Accordingly, the control can be switched with the same pulse width determination regardless of a 200 V series AC power or a 400 V series AC power by monitoring the set width of the on pulse width Wm.

Figure 4:
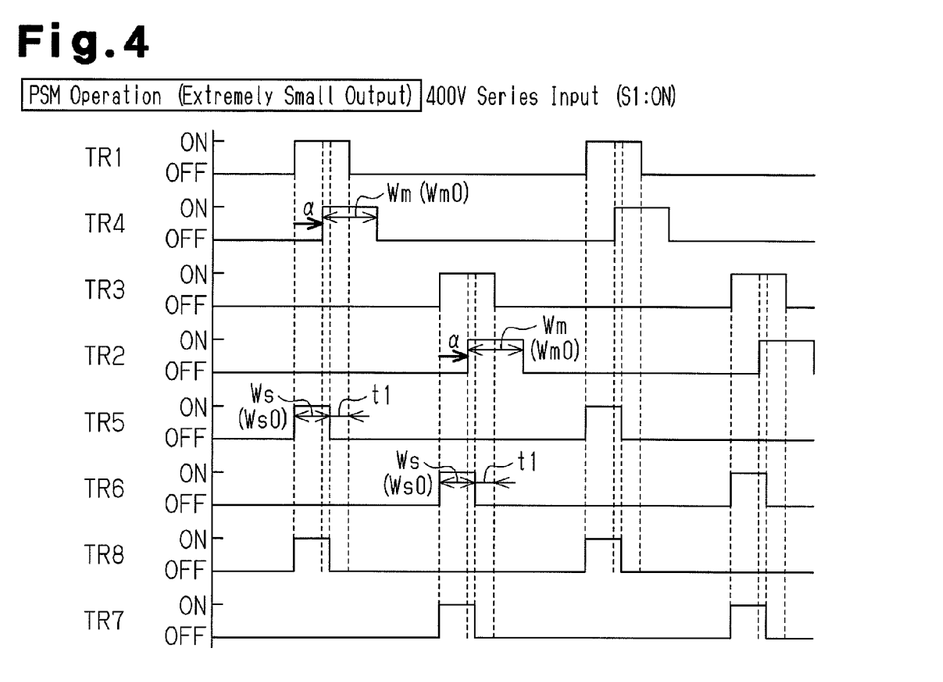
FIG. 4 is a waveform chart of a control pulse signal taken during a PSM operation (during an extremely small output) for 200 V series inputs.

During an extremely small output request, the PSM control using the control pulse signal as shown in FIG. 4 is performed. In the PSM control, in a state in which the on pulse widths Wm and Ws of the control pulse signal provided to the switching elements TR1 to TR8 of the inverter circuit 13 and the auxiliary switching circuit 14 are fixed at the minimum widths Wm0 and Ws0, phase adjustment is performed on the same set of control pulse signals. In the present embodiment, the first switching element TR1 and the third switching element TR3 of the inverter circuit 13 are assigned as the reference phase, and the fourth switching element TR4 and the second switching element TR2 are assigned as the control phase shifted to a phase retarded from the reference phase. The phases of the fifth to eighth switching elements TR5 to TR8 in the auxiliary switching circuit 14 are not adjusted.

The phase (control phase) of the control pulse signal of the fourth switching element TR4 and the second switching element TR2 is set to have a phase difference $\alpha$ from the phase (reference phase) of the control pulse signals of the first switching element TR1 and third switching element TR3, which are of the same set. The phase difference $\alpha$ increases as the output requested during the extremely small output request decreases. That is, the ON period of the first and fourth switching elements TR1 and TR4 and the ON period of the second and third switching elements TR2 and TR3 of the same set greatly shift as the requesting output decreases and the voltage application time at the primary side coil of the transformer INT at the downstream side shortens. This ensures that each of the switching elements TR1 to TR8 is activated when the output of the power supply device 11 is extremely small and solves the problems of output stability, biased magnetism, and the like.

The phase (control phase) of the control signal of the fourth switching element TR4 and the second switching element TR2 is shifted to be retarded from the reference phase. Thus, the second and fourth switching elements TR4 and TR2 are deactivated after the corresponding fifth to eighth switching elements TR5 to TR8 of the auxiliary switching circuit 14 are deactivated. This maintains the effect of reducing the switching loss of the fourth and second switching elements TR4 and TR2 of which the phases are changed by the PSM control.

Further, the PSM control shifts the phases of the control pulse signals having the on pulse widths Wm and Ws of the minimum widths Wm0 and Ws0 at which the first to eighth switching elements TR1 to TR8 can be sufficiently activated. The generation of unnecessary reflux current is reduced at the primary side of the transformer INT, and the power supply device 11 consumes less power.

During a 200 V series input, the switching switch S1 is deactivated. This disconnects the node N1 of the first and second smoothing capacitors C1 and C2 from the node N2 of the seventh and eighth switching elements TR7 and TR8. In this case, as shown by the timing waveform charts of FIGS. 5 to 7, the output control circuit SC controls the first to fourth switching elements TR1 to TR4 of the inverter circuit 13 and the fifth and sixth switching elements TR5 and TR6 of the auxiliary switching circuit 14 with a plurality of control pulse signals. During a 200 V series input, the seventh and eighth switching elements TR7 and TR8 are maintained in the deactivated state.

Figure 5:
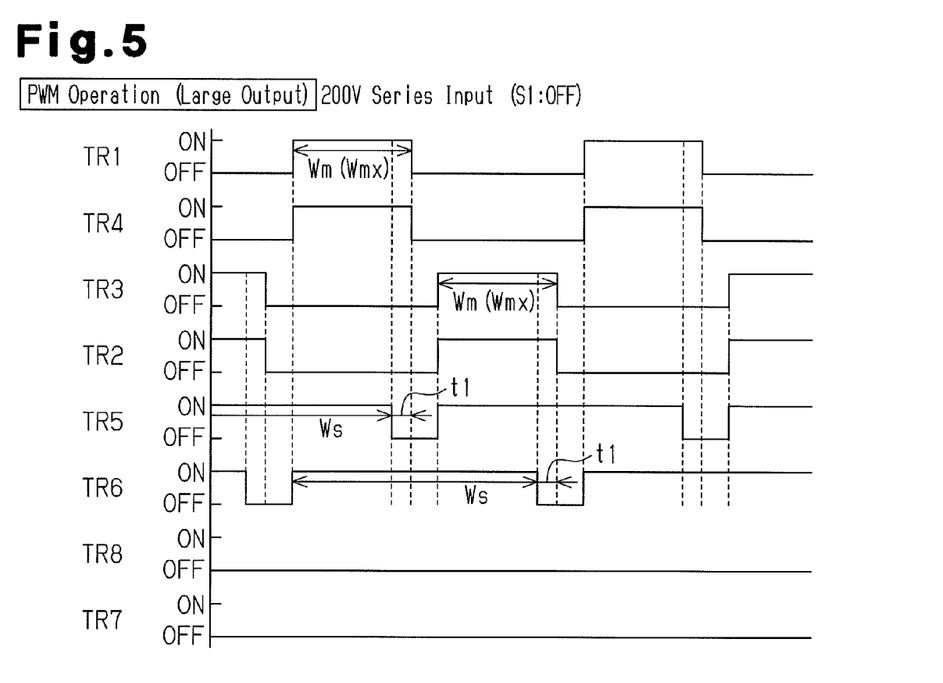
FIG. 5 is a waveform chart of a control pulse signal taken during a PWM operation (during a large output) for 200 V series inputs.
Figure 6:
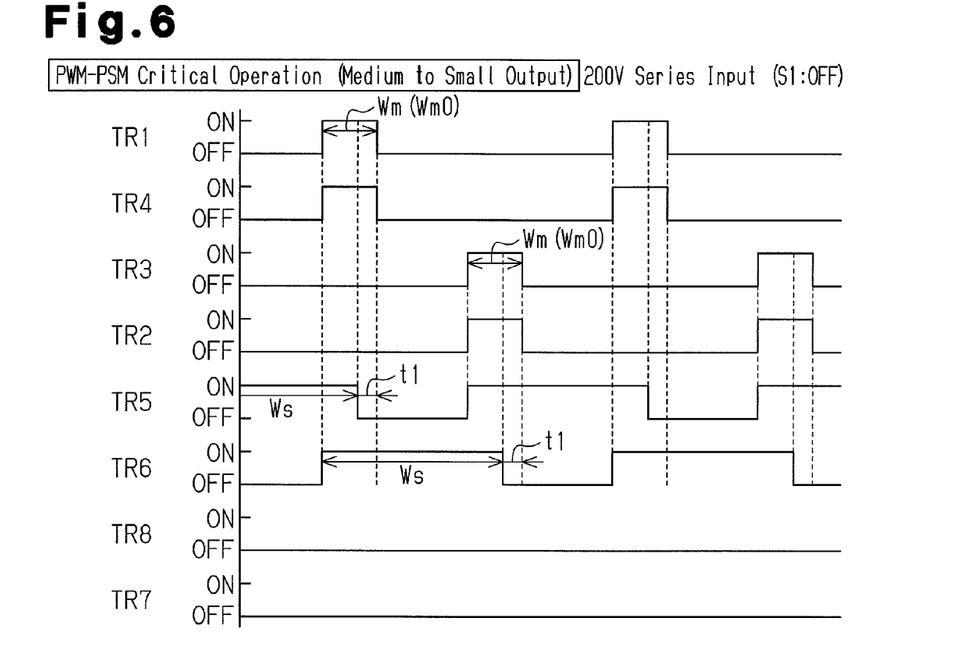
FIG. 6 is a waveform chart of a control pulse signal during a PWM-PSM critical operation (during a medium to small output) in the 200 V series input.

Specifically, during a large to small output request, the output control circuit SC performs the PWM control using a plurality of control pulse signals, as shown in FIG. 5 and FIG. 6. The operation of the inverter circuit 13 is similar to that during a 400 V series input. Each control pulse signal provided to the first to fourth switching elements TR1 to TR4 is similar to that during a 400 V series input.

The seventh and eighth switching elements TR7 and TR8 of the auxiliary switching circuit 14 are maintained in the deactivated state. In the same manner as a 400 V series input, the two control pulse signals provided to the fifth and sixth switching elements TR5 and TR6 fall a predetermined time t1 before when the control pulse signals of the corresponding first to fourth switching elements TR1 to TR4 fall. The timing at which the two control pulse signals provided to the fifth and sixth switching elements TR5 and TR6 rise is changed. The timing at which the control pulse signal provided to the fifth switching element TR5 rises is set to be the same as the timing at which the on pulse immediately before the two control pulse signals provided to the second and third switching elements TR2 and TR3 rise. The timing at which the control pulse signal provided to the sixth switching element TR6 rises is set to be the same as the timing at which the on pulse immediately before the two control pulse signals provided to the first and fourth switching elements TR1 and TR4 rise.

The voltage at the two ends of the first and second smoothing capacitors C1 and C2, that is, the DC voltage from the DC converter circuit 12, is supplied to the inverter circuit 13 when the fifth and sixth switching elements TR5 and TR6 are both activated. That is, the same DC voltage is supplied to the inverter circuit 13 regardless of a 200 V series input and a 400 V series input.

When performing soft switching control for deactivating the fifth and sixth switching elements TR5 and TR6 before the first to fourth switching elements TR1 to TR4 of the inverter circuit 13, the switching switch S1 disconnects the node N1 of the first and second smoothing capacitors C1 and C2 and the node N2 of the seventh and eighth switching elements TR7 and TR8. This prevents the voltage at the node N1 of the first and second smoothing capacitors C1 and C2 from being supplied by the two diodes D7 and D8 to the inverter circuit 13. This obtains the effect of reducing the switching loss in the soft switching control during a 200 V series input.

In the PWM control during a 200 V series input, the on pulse widths Wm and Ws of each control pulse signal provided to the first to fourth switching elements TR1 to TR4 of the inverter circuit 13 and the fifth to eighth switching elements TR5 to TR8 of the auxiliary switching circuit 14 are set to gradually narrow in accordance with changes in the request from a large output to an intermediate output, and from an intermediate output to a small output. The control of the first to eighth switching elements TR1 to TR8 shifts from PWM control to PSM control during an extremely small output request that sets the on pulse width Wm to a narrower width than the minimum width Wm0.

During a 200 V series input, the minimum width Ws0 of the on pulse width Ws of the control pulse signal provided to the auxiliary switching circuit 14 is sufficiently wide even if the on pulse width Wm of the control pulse signal provided to the inverter circuit 13 is the minimum width Wm0.

Figure 7:
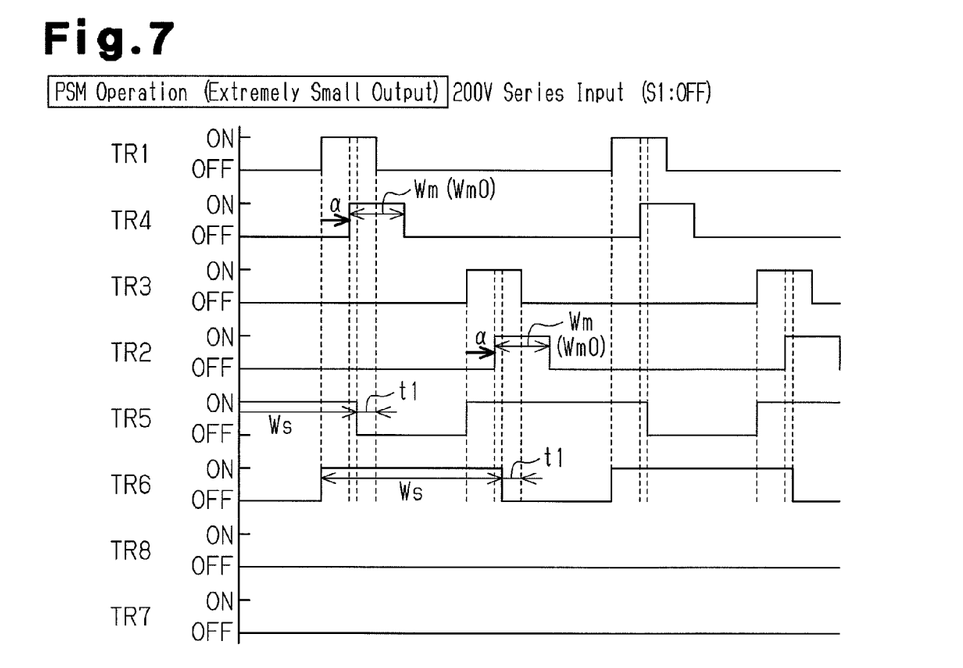
FIG. 7 is a waveform chart of a control pulse signal during a PSM operation (during an extremely small output) for 200 V series inputs.

During an extremely small output request, the PSM control using the control pulse signal as shown in FIG. 7 is performed. PSM control during a 200 V series input is an operation similar to that during a 400 V series input. The phase (control phase) of the control pulse signal provided to the fourth switching element TR4 and the second switching element TR2 of the control phase is shifted to be retarded from the reference phase. This further shortens the voltage application time of the primary side coil in the downstream transformer INT. As described above, the on pulse width Ws of the control pulse signal provided to the auxiliary switching circuit 14 is set to be narrower than a 400 V series input. The on pulse width Ws of the control pulse signal provided to the auxiliary switching circuit 14 is set to be sufficiently wide during a 200 V series input. This ensures that each switching element TR1 to TR8 is activated even when the output of the power supply device 11 is extremely small.

The present embodiment has the advantages described below.

(1) The power supply device 11 is applicable to any one of the input power supplies of a 200 V series (first voltage value) and a 400 V series (second voltage value) due to the switching of the operation of the auxiliary switching circuit 14 based on the switching of the switching switch S1. When a large output is requested, PWM control is performed to adjust the on pulse widths Wm and Ws of the control pulse signals provided to the first to eighth switching elements TR1 to TR8 of the inverter circuit 13 and the auxiliary switching circuit 14, which operates in cooperation with the inverter circuit 13. When a small output is requested, PSM control is performed to adjust the phase difference α of two control pulse signals provided to the first to fourth switching elements TR1 to TR4 in the same set of the inverter circuit 13. In this manner, when performing PWM control during a low output request, each switching element TR1 to TR8 of the inverter circuit 13 and the auxiliary switching circuit 14 may not be activated. Thus, PSM control is performed during a low output request, and the output is lowered by the phase adjustment in a state in which the on pulse widths Wm and Ws of each control pulse signal are ensured. In the present embodiment, this is performed in a state in which the on pulse widths Wm and Ws of each control pulse signal is fixed to the minimum widths Wm0 and Ws0 allowing for activation. Activation of each of the switching elements TR1 to TR8 of the inverter circuit 13 and the auxiliary switching circuit 14 is ensured even when there is a low output request for any of the input power supplies of the 200 V series and the 400 V series. Thus, a stable output can be obtained.

(2) When the on pulse widths Wm and Ws are the minimum widths Wm0 and Ws0, the control of the first to eighth switching elements TR1 to TR8 switches from PWM control to PSM control. During PSM control, the phase of each control pulse signal is adjusted in a state fixed at the minimum widths Wm0 and Ws0 that sufficiently activates the first to eighth switching elements TR1 to TR8. Thus, when switching to PSM control, the minimum widths Wm0 and Ws0 are maintained, and activation of each of the switching elements TR1 to TR8 in the inverter circuit 13 and the auxiliary switching circuit 14 is ensured. This stabilizes the output as well as the output when switching controls.

(3) The deactivation of the fifth to eighth switching elements TR5 to TR8 in the auxiliary switching circuit 14 before the first to fourth switching elements TR1 to TR4 of the inverter circuit 13 are deactivated is maintained even when the phase adjustment of the control pulse signal is performed during PSM control. Thus, the soft switching operation in which the first to fourth switching elements TR1 to TR4 of the circuit 13 are deactivated after the voltage supply to the inverter circuit 13 is stopped is maintained even during PSM control. This reduces switching loss even during PSM control.

(4) The control of the output control circuit SC switches the switching switch S1 to a connecting state based on the determination of a 400 V series input and switches the switching switch S1 to a disconnecting state based on the determination of a 200 V series input. In this manner, the switching of the switching switch S1 is automatically performed under the control of the output control circuit SC1. Thus, there is no need for a manual operation.

(5) During PSM control, when the period (period in which only the switching elements TR4 and TR2 are activated) from when the switching elements TR1 and TR3 are deactivated to when the switching elements TR4 and TR2 are deactivated becomes long, unnecessary reflux current is generated at the primary side coil. In the present embodiment, however, the on pulse widths Wm of the switching elements TR4 and TR2 during PSM control is set to the minimum width Wm0. This prevents the generation of unnecessary reflux current. Further, the reduction in conduction loss during reflux current generation lowers power consumption. In the arc machining power supply device 11 of the present embodiment, a large output current may be generated during a low output. This may lengthen the time during which the reflux current is generated. The present embodiment can effectively reduce the reflux current. This has great significance when embodied in the arc machining power supply device 11.

It should be apparent to those skilled in the art that the present invention may be embodied in many other specific forms without departing from the spirit or scope of the invention. Particularly, it should be understood that the present invention may be embodied in the following forms.

Figure 8:
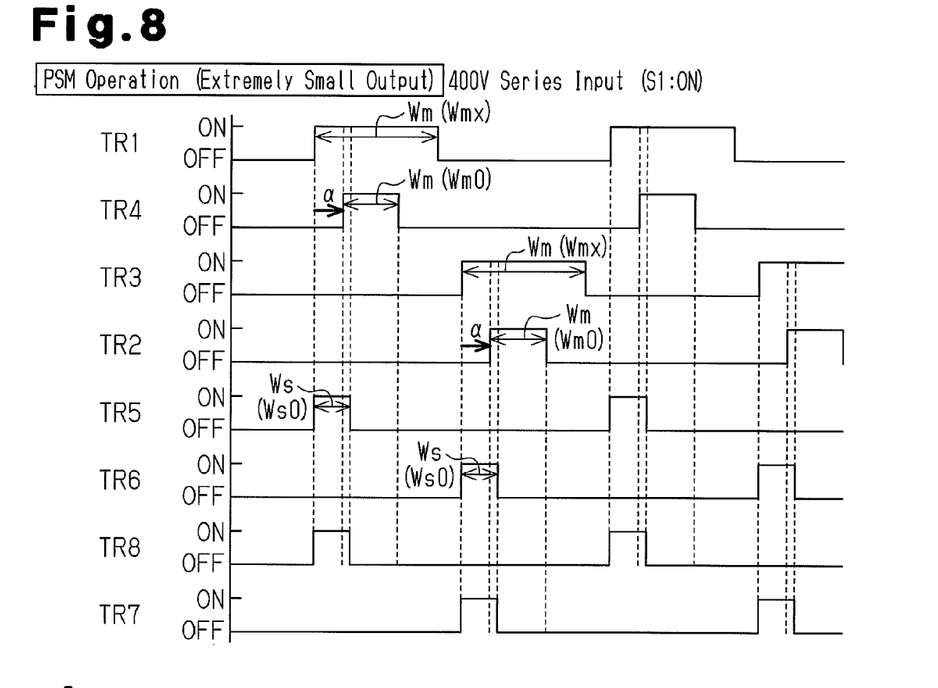
FIG. 8 is a waveform chart of a control pulse signal during a PSM operation (during an extremely small output) for 400 V series inputs in another example.
Figure 9:
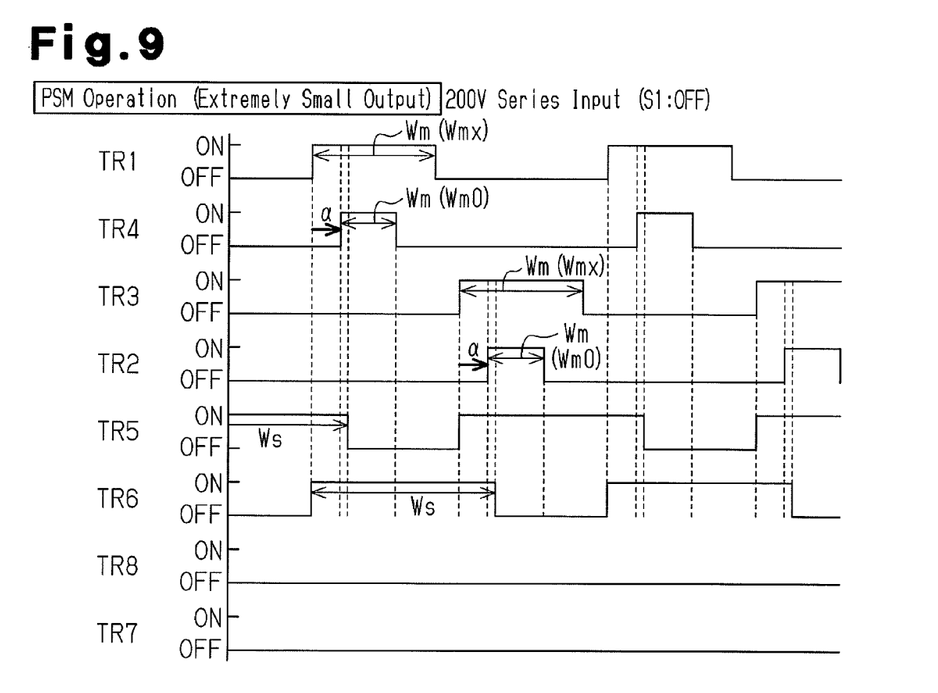
FIG. 9 is a waveform chart of a control pulse signal during a PSM operation (during an extremely small output) for 200 V series inputs of another example.

In the embodiment described above, the same control pulse signal is provided to the first to fourth switching elements TR1 to TR4 in the same set. However, one of the two control pulse signals in the same set may always be set to the maximum width Wmx. As shown by the waveform taken during PSM control for a 400 V series input in FIG. 8 and the waveform taken during PSM control for a 200 V series input in FIG. 9, for example, the on pulse width Wm of the control pulse signal of the first and third switching elements TR1 and TR3 having the reference phase is always fixed at the maximum width Wmx during the PSM control and during PWM control (not shown). In contrast, as for the control pulse signal of the fourth and second switching elements TR4 and TR2 having the control phase, the on pulse width Wm may be changed during PWM control and the phase may be retarded (phase difference α) during PSM control. In this case, the deactivation of the switching elements TR5 to TR8 before deactivation of the switching elements TR1 to TR4 is maintained. This maintains the soft switching operation. The phase may also be advanced. The switching elements TR1 to TR4 of the control phase and the reference phase may be exchanged.

Figure 10:
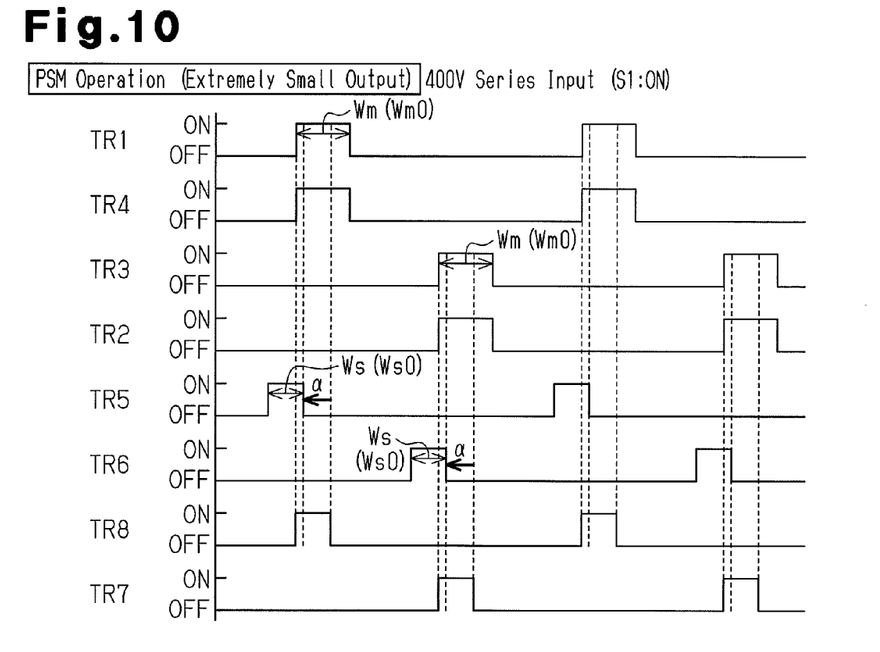
FIG. 10 is a waveform chart of a control pulse signal during a PSM operation (during an extremely small output) for 400 V series inputs in another example.
Figure 11:
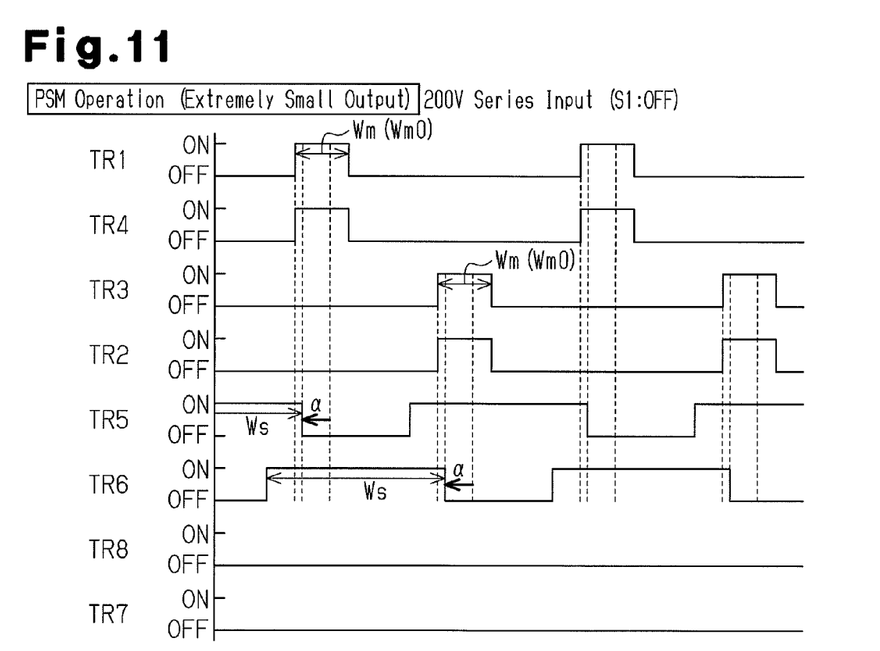
FIG. 11 is a waveform chart of a control pulse signal during a PSM operation (during an extremely small output) for 200 V series inputs in another example.
Figure 12:
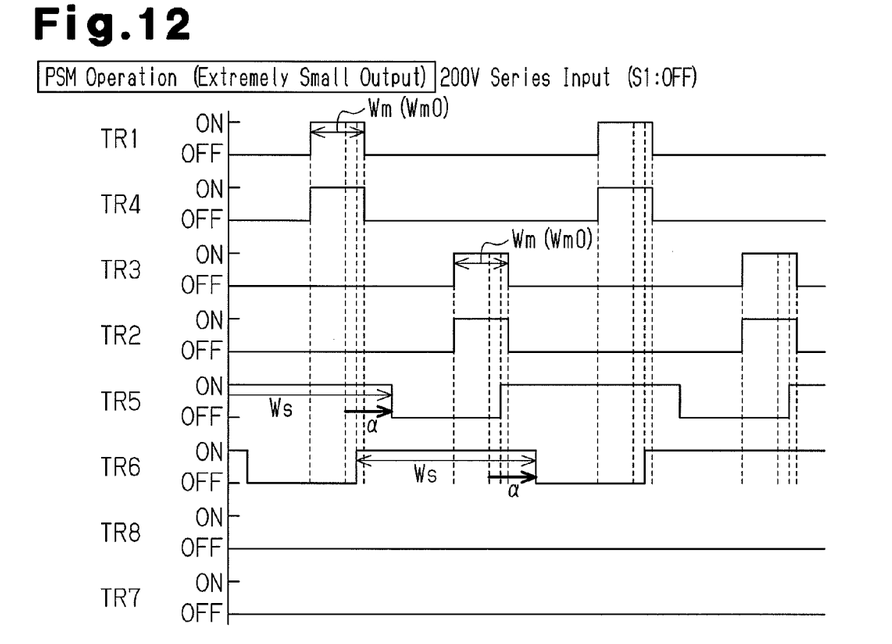
FIG. 12 is a waveform chart of a control pulse signal during a PSM operation (during an extremely small output) for 200 V series inputs in another example.

In the embodiment described above, one of the first to fourth switching elements TR1 to TR4 in the same set of the inverter circuit 13 is set as the subject (control phase) for phase shifting during PSM control. However, the fifth to eight switching elements TR5 to TR8, for example, the fifth and sixth switching elements TR5 and TR6 of the auxiliary switching circuit 14 may be set as the subject for phase shifting. As shown by the waveform taken during PSM control for a 400 V series input in FIG. 10 and the waveform taken during PSM control for a 200 V series input in FIG. 11, for example, the control pulse signal of the first to fourth switching elements TR1 to TR4 may be fixed and the phase may be advanced (phase difference α) from the control pulse signal of the fifth and sixth switching elements TR5 and TR6. This also maintains the deactivation of the fifth to eighth switching elements TR5 to TR8 before the deactivation of the first to fourth switching elements TR1 to TR4. Thus, the soft switching operation is maintained. Only the waveform taken during PSM control for a 200 V series input is shown in FIG. 12. However, the phase of the control pulse signal of the fifth and sixth switching elements TR5 and TR6 may be retarded. The phase of the seventh and eighth switching elements TR7 and TR8 may be shifted during a 400 V series input. The fifth to eighth switching elements TR5 to TR8 may all be set as the subject for phase shifting.

Figure 13:
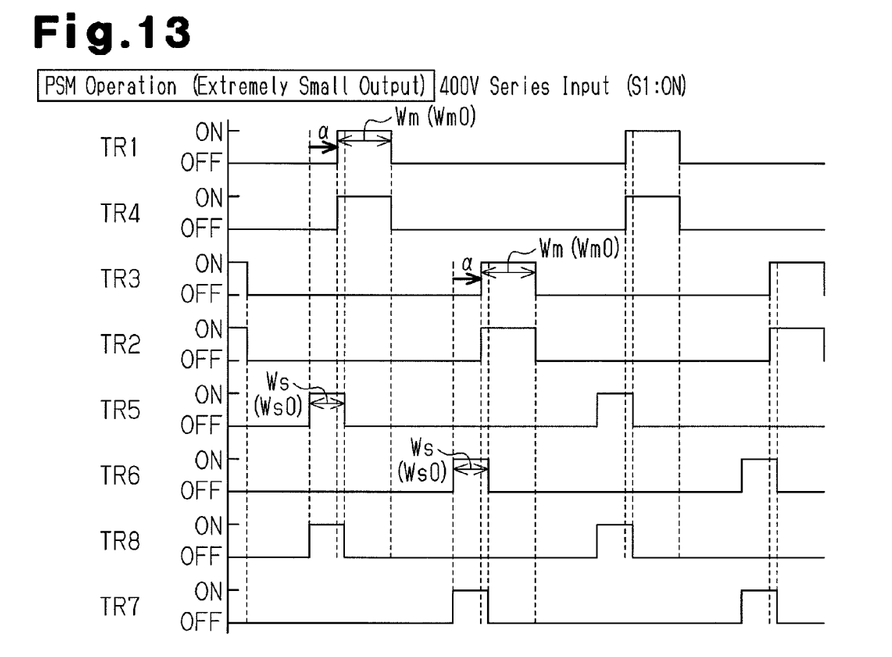
FIG. 13 is a waveform chart of a control pulse signal during a PSM operation (during an extremely small output) for 400 V series inputs in another example.
Figure 14:
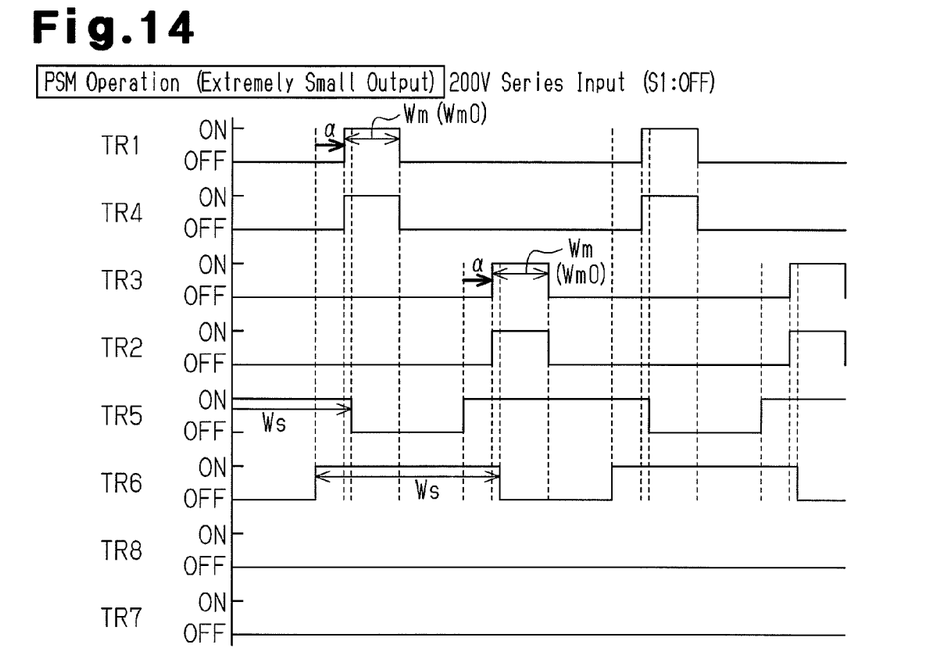
FIG. 14 is a waveform chart of a control pulse signal during a PSM operation (during an extremely small output) for 200 V series inputs in another example.
Figure 15:
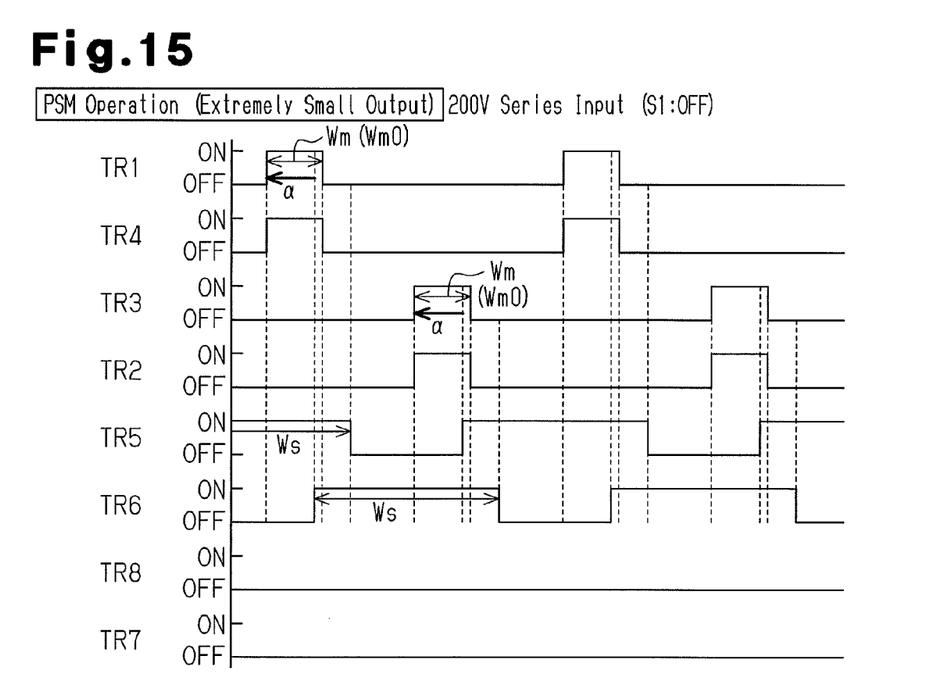
FIG. 15 is a waveform chart of a control pulse signal during a PSM operation (during an extremely small output) for 200 V series inputs in another example.

The subject (control phase) of phase shifting during PSM control is one of the first to fourth switching elements TR1 to TR4 in the same set of the inverter circuit 13. However, the first to fourth switching elements TR1 to TR4 may all be set as the subject for phase shifting. As shown by the waveform taken during PSM control for a 400 V series input in FIG. 13 and the waveform taken during PSM control for a 200 V series input in FIG. 14, for example, the phase may be retarded (phase difference α) from the control pulse signal of the switching elements TR1 to TR4. This also maintains the deactivation of the fifth to eighth switching elements TR5 to TR8 before the deactivation of the first to fourth switching elements TR1 to TR4. This maintains the soft switching operation. Only a waveform taken during PSM control for a 200 V series input is shown in FIG. 15. However, the phase of the control pulse signal of the first to fourth switching elements TR1 to TR4 may be advanced. The phase of either the seventh and eighth switching elements TR7 and TR8 or the fifth and sixth switching elements TR5 and TR6 may be shifted in synchronism with the first to fourth switching elements TR1 to TR4 during a 400 V series input.

Furthermore, the modes of the PWM control and the PSM control of the inverter circuit 13 and the auxiliary switching circuit 14 may be combined with various modes described above. Further, in addition to being determined in advance as the specification, the mode of control may also be changed during control.

In the embodiment described above, the predetermined narrow pulse width used for determining switching determination from PWM control to PSM control is set to the minimum width Wm0 and Ws0 but may be set to a width slightly larger than the minimum width Wm0 and Ws0 at which the switching elements TR1 to tR8 can be activated. The control may be switched based on, for example, the actual output value or the set output value of the power supply device 11 in addition to the pulse width.

The configuration of the power supply device 11 in the embodiment described above may be changed. For example, the switching elements TR1 to TR8 are formed by IGBTs but may be formed by switching elements other than IGBTs such as MOS transistors, thyristors, and the like.

The switching switch S1 includes a relay. However, a switch other than a relay such as a semiconductor switch may be used. The switch is automatically switched in the present embodiment. A switch that is manually switched may be used instead.

The output converter circuit is formed by the rectifier circuit DR2 and the DC reactor DCL but may be changed in accordance with the load.

The DC converter circuit 12 is used for a specification that inputs AC power. However, the DC converter circuit 12 may be omitted or be replaced by a voltage converter circuit or the like for a specification that inputs DC power.

The power supply device 11 of the embodiment described above is an arc machining power supply device. However, the power supply device 11 may be applied to other power supply devices.

A technical idea, which can be grasped from the above embodiments and other cases, is described below.

A power supply device comprising:
an inverter circuit including a bridge circuit of first to fourth switching elements, wherein predetermined sets of the first to fourth switching elements are alternately activated and deactivated to convert DC voltage supplied by two power lines into a predetermined AC voltage;
an auxiliary switching circuit including
an auxiliary capacitor connected between the two power lines at a downstream side of the inverter circuit,
first and second smoothing capacitors connected in series between the two power lines at a downstream side of the auxiliary capacitor,
fifth and sixth switching elements respectively arranged on the two power lines between the first and second smoothing capacitors and the auxiliary capacitor,
seventh and eighth switching elements connected in series between the two power lines between the first and second smoothing capacitors and the auxiliary capacitor, and
a switching unit that connects or disconnects a first node of the first and second smoothing capacitors and a second node of the seventh and eighth switching elements, wherein
the switching unit disconnects the first and second nodes when the input AC power has a first voltage value to supply a voltage across two terminals of the first and second smoothing capacitors to the inverter circuit, and
the switching unit connects the first and second nodes when the input AC power has a second voltage value that is two times greater than the first voltage value so that soft switching control is performed by activating and deactivating predetermined sets of the fifth to eighth switching elements, alternately supplying the inverter circuit with a voltage across the terminals of the first or second smoothing capacitor, and
deactivating a predetermined one of the fifth to eighth switching elements before the first to fourth switching elements are deactivated to stop the voltage supplied to the inverter circuit;
a pulse width modulation control unit that adjusts an on pulse width of a control pulse signal provided to the first to fourth switching elements and adjusts an on pulse width of a control pulse signal provided to the fifth to eighth switching elements accordance with the adjusted width;
a phase shift control unit that adjusts a phase difference of two control pulse signals provided to the same set of switching elements in the first to fourth switching elements or adjusts a phase difference of two control pulse signals provided to predetermined ones of the first to fourth switching elements and corresponding ones of the fifth to eighth switching elements; and
two control pulse signals provided to the switching elements in a same set of the first to fourth switching elements, or for adjusting a mutual phase difference of a pair of control pulse signals provided to a predetermined switching element of the first to fourth switching elements and a corresponding switching element of the fifth to eighth switching elements; and
a control switching unit that operates the pulse width modulation control unit when a relatively large output is requested and operates the phase shift control unit when a relatively small output is requested.

The invention claimed is:

1. A power supply device comprising:
a DC converter circuit including a rectifier circuit and first and second smoothing capacitors, which are connected in series and arranged between two power lines at an output side of the rectifier circuit, wherein the DC converter circuit rectifies and smooths input AC power and converts the input AC power into DC voltage;
an inverter circuit including a bridge circuit of first to fourth switching elements, wherein predetermined sets of the first to fourth switching elements are alternately activated and deactivated to convert the DC voltage to a predetermined AC voltage;
an auxiliary switching circuit including an auxiliary capacitor, which is connected between the two power lines between the DC converter circuit and the inverter circuit, fifth and sixth switching elements respectively arranged on the two power lines between the DC converter circuit and the auxiliary capacitor, seventh and eighth switching elements connected in series between the two power lines between the auxiliary capacitor and the first and sixth switching elements, and a switching unit that connects or disconnects a first node of the first and second smoothing capacitors and a second node of the seventh and eighth switching elements, wherein
the switching unit disconnects the first and second nodes when the input AC power has a first voltage value to supply a voltage across two terminals of the first and second smoothing capacitors to the inverter circuit, and
the switching unit connects the first and second nodes when the input AC power has a second voltage value that is two times greater than the first voltage value so that soft switching control is performed by activating and deactivating predetermined sets of the fifth to eighth switching elements, alternately supplying the inverter circuit with a voltage across the terminals of the first or second smoothing capacitor, and deactivating a predetermined one of the fifth to eighth switching elements before the first to fourth switching elements are deactivated to stop the voltage supplied to the inverter circuit;
a pulse width modulation control unit that adjusts an on pulse width of a control pulse signal provided to the first to fourth switching elements and adjusts an on pulse width of a control pulse signal provided to the fifth to eighth switching elements in accordance with the adjusted width;
a phase shift control unit that adjusts a phase difference of two control pulse signals provided to the same set of switching elements in the first to fourth switching elements or adjusts a phase difference of two control pulse signals provided to predetermined ones of the first to fourth switching elements and corresponding ones of the fifth to eighth switching elements; and
a control switching unit that operates the pulse width modulation control unit when a relatively large output is requested and operates the phase shift control unit when a relatively small output is requested,
wherein the control switching unit operates the phase shift control unit when an output is requested that may result in the on pulse width being smaller than the predetermined narrow pulse width to adjust a phase of the control pulse signal in a state in which the on pulse width of the control pulse signal provided to the first to fourth switching elements is fixed at a first narrow pulse width and the on pulse width of the control pulse signal provided to the fifth to eighth switching elements is fixed at a second narrow pulse width.

2. The power supply device according to claim 1, wherein the control switching unit operates the pulse width modulation control unit when an output is requested that sets the on pulse width to be larger than a predetermined narrow pulse width allowing for each of the switching elements to be sufficiently activated.

3. The power supply device according to claim 1, wherein the phase shift control unit adjusts the phase of the control pulse signal provided to the first to eighth switching elements so that the fifth to eighth switching elements are deactivated before the first to fourth switching elements are deactivated.

4. The power supply device according to claim 1, further comprising a switch control unit that controls the switching unit to connect the first and second nodes when the input AC power has the second voltage value and disconnects the first and second nodes when the input AC power has the first voltage value.

5. An arc machining power supply device comprising:
the power supply device according to claim 1; and
a rectifier circuit that rectifies the predetermined AC voltage provided from the power supply device and generates an arc machining voltage for performing arc machining on a machining subject.

* * * * *